United States Patent Office 3,240,748
Patented Mar. 15, 1966

3,240,748
POLYOXYMETHYLENE STABILIZED BY
TRIALLYL CYANURATE
Heinz Schmidt, Günther Roos, and Hans Dieter Hermann, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed July 12, 1961, Ser. No. 126,429
Claims priority, application Germany, July 12, 1960,
F 31,636
8 Claims. (Cl. 260—45.8)

The present invention relates to a process for stabilizing polyacetals, advantageously polyoxymethylene, against heat, oxygen and light.

The term "polyacetals" as used herein is intended to mean polymers and copolymers containing in relatively long chains the following structural element

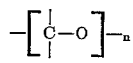

wherein two hydrogen atoms or one hydrogen atom and an alkyl radical which may carry substituents, are bound to the carbon atom. Polyacetals can be prepared in various ways. German Auslegeschrift 1,037,705, for example, describes the manufacture of macromolecular polyformaldehyde (polyoxymethylene) of good thermal stability from purified formaldehyde with the use of anionically active catalysts in inert solvents. Alternatively, 1,3,5-trioxan can be polymerized in the melt, solution or solid state with the use of a cationically active catalyst to yield corresponding to polyoxymethylene of high molecular weight and good thermal stability. It has also been proposed to prepare polyacetals from higher aldehydes, for example acetaldehyde or propionaldehyde. The stabilization of polyacetals described below can also be extended to polymers which are obtained by copolymerizing aldehydes or cyclic acetals, such as trioxan, with formals or cyclic ethers. Trioxan can be copolymerized with the following formals, for example: diethyleneglycol formal, dioxolanes, butanediol formal or cyclic ethers, e.g. ethylene oxide, oxacyclobutane or tetrahydrofurane. In addition to acetal linkages, the polymer chains of these copolymers contain ether-linkages which interrupt the acetal chains. Copolymers consisting of 90 to 99% trioxan and 10 to 1% diethyleneglycol formal or 10 to 1% butane-diol formal can be obtained by the process described in Belgian Patent 591,716.

The polyacetals with terminal hydroxyl groups which are first obtained in the polymerization undergo depolymerization on being heated and they must therefore be stabilized by esterifying or etherifying these terminal hydroxyl groups.

Under the action of heat such as generated in the treatment of polyacetals on customary thermoplast-processing machines, it is found that even the polyacetals having stabilized terminal groups are more or less unstable and have the tendency to undergo depolymerization and chain cleavage with the formation of monomeric aldehydes and secondary products of these aldehydes. It has therefore been proposed to stabilize polyacetals against heat by incorporating therewith hydrazine, urea or thiourea derivatives as well as polyamides and dicarboxylic acid diamides. The dicarboxylic acid diamides described in Belgian Patent 584,257 are especially suitable for stabilizing polyacetals against thermal decomposition.

The aforesaid compounds are intended to bind the aldehydes and other secondary products of these aldehydes which are formed by thermal decomposition, to block the active centers appearing in the polymer, and to prevent depolymerization.

Polyacetals are even more unstable against the combined action of oxygen and heat. The stabilizers which have hitherto been used to avoid such oxidative degradation include amines, phenols and as taught in German Auslegeschrift 1,076,363 organic compounds containing sulfur and nitrogen atoms in their molecule, for example thiodiazoles. For this purpose, there may also be used the organic mono- and polysulfide compounds disclosed in Belgian Patent 599,409.

The light stabilizers include known compounds of the benzophenone type which are active in the ultraviolet range.

We have now found that polyacetals can be stabilized against heat and oxygen by incorporating with macromolecular polyacetals 0.1 to 10% by weight, preferably 0.5 to 5% by weight, calculated upon the polymer to be stabilized, of a compound of the formula:

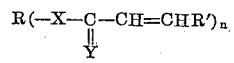

wherein $n$ is a whole number of 1 to 3, R' represents a hydrogen atom or an alkyl radical having 1 to 5 carbon atoms or an aryl radical, e.g. the phenyl radical, X represents —O—, —S—, —NH or —NR", R" represents an alkyl radical having to 1 to 4 carbon atoms or a heterocyclic radical bound via the nitrogen atom, Y represents hydrogen or oxygen, and R represents a hydrogen atom, an alkyl, alkenyl, alkylene, aryl, aralkyl, alkylaryl, cycloalkyl, acyl, carbamide, thiocarbamide or heterocyclic radical which may carry substituents and wherein R may be omitted when X represents —S— or —NH—, and when $n$ is 2.

It is assumed but this statement is not intended to limit the invention that in all these compounds the aliphatic double bond, which is activated due to the hetero atom being linked to the adjacent carbon atom, constitutes the actually active grouping.

Allyl compounds, esters and amides of acrylic acid and crotonic acid are especially active compounds. The following substances may be mentioned more especially, for example, without limiting the present process to the use of these specific stabilizers: triallyl cyanurate, diallyl ethers, diallyl thioether, phthalic acid diallylester, N,N'-diallyl malonic acid diamide, hexamethylene-bis-allylurea, allylhydantoin, allylthiohydantoin, diallyl thiourea, methylene-bis-acrylamide, methylene-bis crotonamide, crotonic acid amide, diallyl disulfide, acetic acid allyl ester, ortho-eugenol, allyl esters of the acetoacetic ester and N,N'-diacryloyl-hydrazine.

The activity of these stabilizers can be substantially enhanced by admixing therewith as costabilizer 0.01 to 10%, advantageously 0.1 to 5%, calculated upon the polymer to be stabilized, of an antioxidant, e.g. a phenol, which may be hydrogenated to an extent of 80%, or an organic sulfur compound in which the sulfur is bound to a —SH, —S—$_n$ or =S group, whereby $n$ is a whole number of 1 to 4, or a dicarboxylic acid diamide. Combining these differently active stabilizers involves synergism. Thus, for example, the isobornyl xylenols which may be partially hydrogenated, e.g. 6-isobornyl-2,4-xylenol in association with triallyl cyanurate or methylene bisacrylamide, exhibit a very good stabilizing activity. As further phenolic compounds there may be used, for example, methoxy-nonylphenol, 2,6-dimethylol-p-cresol, the condensation product of acetone and nonylphenol, 2,6-diisobornyl-p-cresol, or the condensation product of o-cresol, camphene and formaldehyde the double bonds of which are hydrogenated to an extent of 25%.

Combinations of the stabilizers used in this invention with bis-(benzoylaminoethyl)-disulfide also exhibit a good stabilizing activity.

As further organic sulfur compounds there may be mentioned, for example: bis-(octadecylmercapto)-sulfide, β-thiostearyl propionic acid laurylester, bistearyl sulfide or octadecylmercaptane.

Combinations of the present stabilizers with dicarboxylic acid diamides, e.g. malonic acid diamide or thiodipropionic acid diamide, also exhibit a good stabilizing activity.

Especially stable products of very good utility can be obtained by incorporating a known light stabilizer with the polyacetals stabilized according to this invention.

The use of polyacetals as plastic material necessitates sufficient stability of these products for treatment in the thermoplastic state. In the treatment on the customary thermoplast-processing machines, the compounds listed above have the function to repress or suppress depolymerization since otherwise useless blistered material is obtained.

When the polymers have a very pronounced tendency to undergo depolymerization, the pressure of the gaseous decomposition products in the cylinder of the injection molding machine may become so high that the melt is ejected from the cylinder.

To characterize this processing stability which equals thermostability the following test conducted under practice conditions was used to determine the time after which the polymer began to depolymerize. The degree of thermal degradation was determined by measuring the change in the flow behaviour of the melt. (Melt index $i_2$ at 210° C.). In this test, the behaviour of the plastic mass corresponded substantially to that observed in thermoplastic processing, for example in the cylinder of an injection molding machine. The testing device was an apparatus such as used for the determination of the melt index of thermoplastic masses (ASTM–1238–52T). The apparatus comprises a heated metal cylinder with a cylindrical bore hole 9.5 mm. wide into which a nozzle with a bore hole 2 mm. wide can be inserted and fixed in the lower part of the cylinder. Into the cylindrical bore hole of the metal cylinder fits a punch 9.5 mm. wide which can be moved freely and loaded with 2 kg. or 5 kg. The punch serves to eject the melt. The cylinder kept thermoconstant at 210° C. is charged with individual polyacetals admixed with the above stabilizers and the polyacetals are stamped. The punch is put on without load and the time is determined after which gas evolution can be observed. By means of a metal locking bar disposed at the lower end of the cylinder the nozzle disposed in the lower portion of the cylinder is closed. The gases evolved on depolymerization press the punch upward and thus indicate the commencing decomposition.

After a time of stay of the material in the apparatus of 5, 15 and 30 minutes, respectively, the melt index $i_2$ at 210° C. (2 kg. load) of the individual charges was determined in known manner. The plastic mass flowing off during the determination of the melt index is investigated as to formation of blisters.

The stabilizers may be admixed with the polyacetals in known manner. The fine-powdered stabilizer may be incorporated into the polyacetal in a mixer, or a solution of the stabilizer in a solvent is incorporated, while stirring, into the polyacetal which is then freed from solvent in a hot current of nitrogen, while stirring. Still further, the stabilizer and polyacetals may be suspended in a solvent which is subsequently removed. The stabilizers may also be incorporated into the molten polymer by kneading.

The above compounds can be used for stabilizing macromolecular polyacetals containing free terminal hydroxyl groups, or advantageously for stabilizing polyacetals whose terminal hydroxyl groups have been blocked by esterification or etherification.

The following examples serve to illustrate the invention, but they are not intended to limit the process to the use of the stabilizers specifically employed in these examples. In each case, the polyacetals were mixed in the manner described in the examples with the stabilizers and made into press plates. Table 1 below indicates the values found in the individual mixtures for tendency to depolymerization, the melt indices (measured on the powder mixture), age resistance to heat and light stability (measured on the press plates) and comparison values for unstabilized polyoxymethylene and for polyoxymethylene stabilized with malonic acid diamide. The parts and percentages are by weight, the latter being referred to the polyacetal.

The melt indices $i_2$ were determined at 210° C., i.e. the weight in grams of the melt was determined which was forced through the nozzle within 10 minutes under a load of 2 kg.

The acetylized polyoxymethylenes used in the examples had a solution viscosity of 0.3 to 3 dl./g. or more especially 0.5 to 2 dl./g., determined in a 0.5% solution of the polymer in butyrolactone at 140° C., while adding 2% diphenylamine as stabilizer.

EXAMPLE 1

100 parts of a polyacetal, which had been obtained by polymerizing trioxane by the process described in Belgian Patent 585,980 and subsequently acetylized, were admixed, while stirring, with 1 part triallyl cyanurate in 100 parts acetone, and the acetone was removed while stirring in a hot nitrogen current at 80° C. The mixture obtained was substantially dried by being placed for 2 hours at 70° C. into a vacuum drying cabinet. The stabilized powder so obtained was tested as to its tendency to undergo depolymerization at 210° C. in the testing device described above. Press plates made from the above powder (0.5 mm. thick, pressed at 190° C. under a pressure of 50 kg./cm.$^2$ which was increased on cooling to 100 kg./cm.$^2$) were annealed in a heating cabinet at 120° C. to determine their resistance to aging and, respectively, exposed to an ultraviolet lamp in the fadeometer and the xenon testing apparatus to determine their stability to light. For comparison, the polyoxymethylene was stabilized in analogous manner with malonic acid diamide. The test results obtained are indicated in Table 1 below.

EXAMPLE 2

100 parts of a polyacetal, which had been obtained by polymerizing trioxane and subsequently acetylized, were treated in the manner described in Example 1 with 1 part methylene-bis-acrylamide in 100 parts methanol, and tested. The test results are indicated in Table 1 below.

EXAMPLE 3

100 parts of a polyacetal, which had been obtained by polymerizing trioxane and subsequently acetylized, were treated in the manner described in Example 1 with 1 part allylthiohydantoin in 100 parts methanol, and tested. The test results are indicated in Table 1 below.

EXAMPLE 4

100 parts of a polyacetal, which had been obtained by polymerizing trioxane and subsequently acetylized, were admixed with 0.5 part triallyl cyanurate in 50 parts acetone, 0.5 part malonic acid diamide was added, and the whole was treated in the manner indicated in Example 1. The test results are indicated in Table 1 below.

EXAMPLE 5

100 parts of a polyacetal, which had been obtained by polymerizing trioxane and subsequently acetylized, were treated in the manner described in Example 1 with 1 part 6-isobornyl-2,4-xylenol in 100 parts acetone, and tested. The test results are indicated in Table 1 below.

EXAMPLE 6

100 parts of a polyacetal, which had been obtained by polymerizing trioxane and subsequently acetylized, were treated in the manner described in Example 1 with 1 part triallyl cyanurate in 100 parts acetone and 1 part bis-(benzoylaminoethyl)-disulfide in 100 parts methanol, and tested. The test results are indicated in Table 1 below.

EXAMPLE 7

100 parts of a polyacetal, which had been obtained by polymerizing trioxane and subsequently acetylized, were treated in the manner described in Example 1 with 1 part methylene-bis-acrylamide in 100 parts methanol and 1 part isobornyl xylenol in 100 parts acetone, and tested. The test results are indicated in Table 1 below.

EXAMPLE 8

100 parts of a polyacetal, which had been obtained by polymerizing trioxane and subsequently acetylized, were treated in the manner described in Example 1 with 1 part methylene-bis-acrylamide in 100 parts methanol and 1 part bis-stearylsulfide, and the tendency to undergo decomposition was investigated. The test results obtained are indicated in Table 1 below.

EXAMPLE 9

100 parts of a polyacetal, which had been obtained by polymerizing trioxane and subsequently acetylized, were treated in the manner described in Example 1 with 1 part allylthiohydantoin in 100 parts methanol and 1 part bis-stearylsulfide, and tested. The test results are indicated in Table 1 below.

EXAMPLE 10

100 parts of a polyacetal, which had been obtained by copolymerizing 100 parts trioxane and 4 parts diethyleneglycol-formal by the process described in Belgian Patent 591,716, were admixed while stirring with a solution of 1 part triallyl cyanurate and 1 part 6-isobornyl-2,4-xylenol (of which the aromatic double bonds may be hydrogenated to an extent of 80%) in 100 parts acetone. The acetone was then removed while stirring in a current of nitrogen at 80° C., and the product freed from the acetone was placed for 2 hours at 70° C. into a vacuum drying cabinet. To determine the resistance to aging, the stabilized copolymer was made into press plates 0.5 mm. thick and the plates were placed at 120° C. into a warming cabinet. The time was determined which was necessary to so change the press plate that it broke on being bent.

To determine the thermostability, the stabilized copolymer was maintained at 220° C. under nitrogen. The loss in weight was converted into percent/minute and defined as decomposition constant kd. The results obtained are indicated in Table 2 below. For purposes of comparison, the table also indicates the results obtained with an unstabilized copolymer.

EXAMPLE 11

A copolymer as used in Example 10 was admixed with 1 part triallyl cyanurate and 1 part 2,2'-dioxy-4,4',6,6'-tetraisobornyl diphenylmethane (25% hydrogenated) in 100 parts acetone, and treated and tested in the manner described in the preceding example. The test results obtained are indicated in Table 2 below.

EXAMPLE 12

The copolymer of Example 10 was treated in the manner described in that example with 2 parts methylene-bis-acrylamide in 100 parts methanol, and tested. The test results are indicated in Table 2 below.

EXAMPLE 13

The copolymer of Example 10 was treated in the manner described in that example with 1 part methylene-bis-acrylamide and 1 part 6-isobornyl-2,4-xylenol (80% hydrogenated) in 100 parts methanol, and tested. The test results are indicated in Table 2 below.

EXAMPLE 14

The copolymer of Example 10 was treated in the manner described in that example with 1 part methylene-bis-acrylamide and 1 part 2,2'-dioxy-4,4',6,6'-tetraisobornyl-diphenylmethane (25% hydrogenated) in 100 parts methanol, and tested. The test results are indicated in Table 2 below.

*Table 1.—Depolymerization, melt index and embrittlement of press plates of various stabilized polyacetals in a warming cabinet and under the action of light*

| Example No. | Stabilizer | Amount, Percent of weight | Decomposition commencing at 210° C. after min. | Melt index $i_2$ at 210° C. | | | Nature of melt | Storage in warming cabinet, 120° C. embrittlement commencing after days | Embrittlement action of light | |
| | | | | 5' | 15' | 30' | | | Fadeometer [h] | Xenon-lamp [h] |
|---|---|---|---|---|---|---|---|---|---|---|
| 1 | Without | | Immediately strong. | (¹) | (¹) | (²) | Blistered | 2 | 24 | 60 |
| | Malonicaciddiamide | 1 | Immediately | 48.0 | 65.4 | 68.4 | Blistered | 5 | 24 | 168 |
| | Triallyl cyanurate | 1 | 2 little | 47.2 | 66.9 | | Some blisters | 5 | 24 | 144 |
| 2 | Methylene bisacrylamide. | 1 | 2 little | 29.4 | 56.4 | | Some blisters | 5 | 24 | 144 |
| 3 | Allylthiohydantoin | 1 | 5 little | 29.2 | 53.6 | 66.4 | Some blisters | 3 | 24 | 84 |
| 4 | {Triallyl cyanurate<br>{Malonic acid diamide | 0.5<br>0.5 | 10 little | 33.3 | 59.1 | | Some blisters | 5 | 24 | 144 |
| 5 | {Triallyl cyanurate<br>{Isobornylxylenol | 1<br>1 | 10 little | 28.9 | 37.2 | 37.7 | Free from blisters | 14 | 48 | 144 |
| 6 | {Triallyl cyanurate<br>{Bis-(benzoylaminoethyl)-disulfide. | 1<br>1 | 5 little | 57.6 | 99.5 | 110.5 | Some blisters | 7 | 24 | 144 |
| 7 | {Methylene bis-Acrylamide.<br>{Isobornylxylenol | 1<br>1 | 8 little | 36.0 | 39 | 42.3 | Free from blisters | 7 | 48 | 168 |
| 8 | {Methylenbisacrylamide.<br>{Bisstearylsulfide | 1<br>1 | 11 little | 30.0 | 30.0 | 32.6 | Free from blisters | 7 | 24 | 144 |
| 9 | {Allylthiohydantoin<br>{Bisstearylsulfide | 1<br>1 | 10 little | 26.2 | 21.1 | 21.0 | Some blisters | 5 | 24 | 84 |

¹ Not measurable.
² Strong decomp. blisters.

Table 2.—Decomposition constant kd and embrittlement of press plates in a heating cabinet of a copolymer stabilized with various stabilizers and prepared from 100 parts by weight trioxane and 4 parts by weight diethylene glycol formal

| Example | Stabilizer | Amount stabilizer in percent | Embrittlement at 120° C. in warming cabinet after days | Decomposition constant $kd$ at 220° C. in percent/min. |
|---|---|---|---|---|
| 10 | Triallyl cyanurate<br>Isobornylxylenol (80% hydrogenated). | 1<br>1 | 4 | 0.08 |
| Comparative test. | | | 2 | 0.22 |
| 11 | Triallyl cyanurate<br>2,2'-dioxy-4,4',6,6'-tetraisobornyl-diphenylmethane (25% hydrogenated). | 1<br>1 | 6 | 0.06 |
| 12 | Methylene bisacrylamide | 2 | 6 | 0.07 |
| 13 | Methylene bisacrylamide<br>Isobornylxylenol (80% hydrogenated). | 1<br>1 | 6–8 | 0.04 |
| 14 | Methylene bisacrylamide<br>2,2'-dioxy-4,4',6,6'-tetraisobornyldiphenylmethane (25% hydrogenated). | 1<br>1 | 6–8 | 0.04 |

We claim:

1. In a composition of matter comprising a macromolecular polyacetal having a major portion of recurring oxymethylene groups and a stabilizer stabilizing said composition against heat and oxygen, the improvement wherein said stabilizer is from 0.1 to 10 percent, by weight of said polyacetal, of triallyl cyanurate.

2. A composition as in claim 1 wherein said polyacetal is a homopolymer of trioxane.

3. A composition as in claim 1 wherein said polyacetal is a copolymer of trioxane with 1 to 10 percent by weight of diethylene glycol formal.

4. A composition as in claim 1 wherein said polyacetal is a copolymer of trioxane with 1 to 10 percent by weight of butanediol formal.

5. A composition as in claim 1 wherein said polyacetal is a copolymer of trioxane with 1 to 10 percent by weight of ethylene oxide.

6. A composition as in claim 1 additionally containing 0.01 to 10 percent, by weight of said polyacetal, of a costabilizer selected from the group consisting of malonic acid diamide, bis-(benzoaminoethyl) disulfide, bis - (stearyl) sulfide, 6-isobornyl-2,4-xylenol, partially hydrogenated 6-isobornyl-2,4-xylenol, 2,2'-dioxy-4,4',6,6'-tetra - isobornyl-diphenylmethane, and partially hydrogenated 2,2'-dioxy-4,4',6,6'-tetra-isobornyl-diphenylmethane.

7. A composition as in claim 6 wherein said costabilizer is 6-isobornyl-2,4-xylenol.

8. A composition as in claim 6 wherein said costabilizer is 6-isobornyl-2,4-xylenol hydrogenated to an extent of 80 percent.

References Cited by the Examiner

UNITED STATES PATENTS

| 2,296,249 | 9/1942 | Austin et al. | 260—45.9 |
| 3,103,499 | 9/1963 | Dolce et al. | 260—45.7 |

FOREIGN PATENTS

| 3,116,267 | 12/1963 | Dolce | 260—45.9 |
| 748,856 | 5/1956 | Great Britain. | |

LEON J. BERCOVITZ, *Primary Examiner.*

MILTON STERMAN, WILLIAM H. SHORT,
*Examiners.*